(12) United States Patent  
Tyagi et al.

(10) Patent No.: US 8,972,074 B2  
(45) Date of Patent: Mar. 3, 2015

(54) SYSTEM AND METHOD FOR OPTIMAL LOAD PLANNING OF ELECTRIC VEHICLE CHARGING

(75) Inventors: Rajesh Tyagi, Niskayuna, NY (US); Matthew Christian Nielsen, Scotia, NY (US); Jayanth Kalle Marasanapalle, Bangalore (IN); Jason Wayne Black, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 132 days.

(21) Appl. No.: 13/075,287

(22) Filed: Mar. 30, 2011

(65) Prior Publication Data

US 2012/0253531 A1    Oct. 4, 2012

(51) Int. Cl.
  *G05D 17/00*   (2006.01)
  *B60L 11/18*   (2006.01)

(52) U.S. Cl.
  CPC ......... *B60L 11/1846* (2013.01); *B60L 11/1816* (2013.01); *B60L 11/184* (2013.01); *B60L 11/1844* (2013.01); *B60L 2240/662* (2013.01); *B60L 2240/72* (2013.01); *B60L 2240/80* (2013.01); *B60L 2260/58* (2013.01); *Y02T 90/128* (2013.01); *Y02T 90/14* (2013.01); *Y02T 90/163* (2013.01); *Y02T 10/7088* (2013.01); *Y02T 10/7005* (2013.01); *Y02T 90/16* (2013.01); *Y02T 90/169* (2013.01); *Y02T 90/121* (2013.01); *Y04S 10/126* (2013.01); *Y04S 30/14* (2013.01); *Y02E 60/721* (2013.01)
  USPC ............ 700/296; 700/286; 700/291; 700/295

(58) Field of Classification Search
  None
  See application file for complete search history.

(56) References Cited

U.S. PATENT DOCUMENTS

| 5,548,200 | A | 8/1996 | Nor et al. | |
|---|---|---|---|---|
| 7,402,978 | B2 | 7/2008 | Pryor | |
| 7,693,609 | B2* | 4/2010 | Kressner et al. | 700/291 |
| 8,054,048 | B2* | 11/2011 | Woody et al. | 320/162 |
| 8,154,246 | B1* | 4/2012 | Heitmann | 320/109 |
| 8,319,358 | B2* | 11/2012 | Curry et al. | 290/1 A |
| 2008/0052145 | A1* | 2/2008 | Kaplan et al. | 705/8 |
| 2008/0281663 | A1 | 11/2008 | Hakim et al. | |
| 2009/0062967 | A1* | 3/2009 | Kressner et al. | 700/286 |
| 2009/0066287 | A1* | 3/2009 | Pollack et al. | 320/101 |
| 2009/0083390 | A1* | 3/2009 | Abu-Ghazaleh et al. | 709/209 |
| 2010/0006356 | A1 | 1/2010 | Curry et al. | |
| 2010/0019726 | A1 | 1/2010 | Kumar | |
| 2010/0094737 | A1 | 4/2010 | Lambird et al. | |
| 2012/0030631 | A1* | 2/2012 | Gonzalez | 715/854 |
| 2012/0036250 | A1* | 2/2012 | Vaswani et al. | 709/224 |

* cited by examiner

*Primary Examiner* — Sean Shechtman
(74) *Attorney, Agent, or Firm* — Joseph J. Christian

(57) ABSTRACT

A system for optimal planning of electric power demand is presented. The system includes a node comprising one or more smart charging plug-in electric vehicles (SCPEVs), a processing subsystem, wherein the processing subsystem receives relevant data from one or more sources; and determines an optimized SCPEV load and optimal charging schedule for the node by applying an operations research technique on the relevant data.

14 Claims, 4 Drawing Sheets

SYSTEM AND METHOD FOR OPTIMAL LOAD PLANNING OF ELECTRIC VEHICLE CHARGING

BACKGROUND

Figure 1:
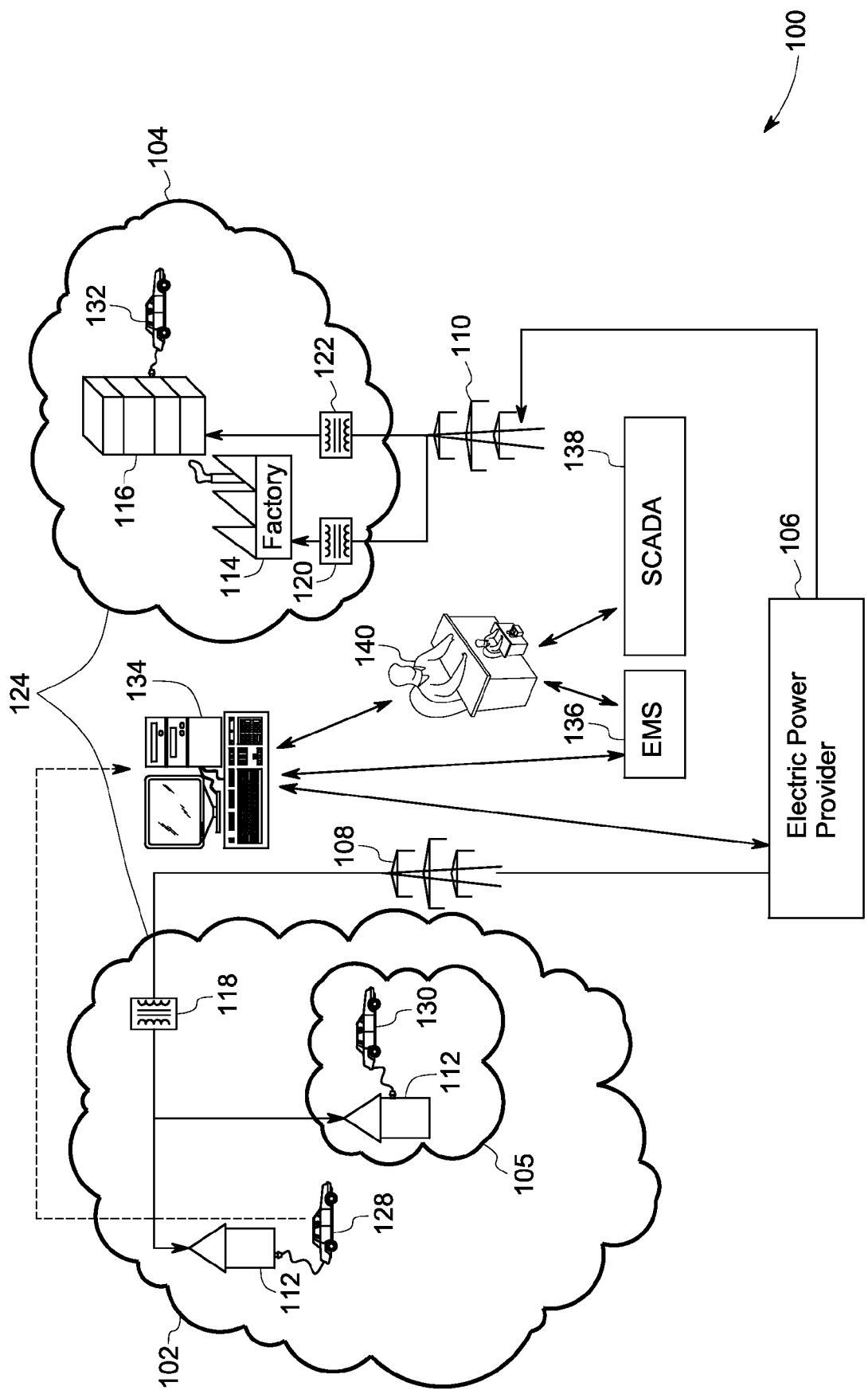

Embodiments of the disclosure relate to plug-in electric vehicles, and more particularly to systems and methods for optimal planning of electric power demand for charging plug-in electric vehicles.

A plug-in electric vehicle (PEV) is a vehicle that uses an on-board electric battery for vehicle propulsion. The electric battery provides electric power to an electric motor, and is charged by connecting a plug to an external electric power source. Additionally, the kinetic energy of PEVs may be recovered during braking and converted to electric energy followed by storing the electric energy in a battery. When PEVs operate on respective electric battery, they do not emit green house gases. Therefore, an increased usage of PEVs may significantly reduce greenhouse gas emissions provided the mode of electric power generation is not coal. Additionally, PEVs have the capability to make the world energy resilient, or less dependent on gasoline. Hence, PEVs represent an important step towards an increased fuel efficiency, decreased emissions, and greater energy independence. The usage of PEVs is also being promoted by governments of many countries by providing advantages to PEV owners like tax exemptions.

However, increased adoption of PEVs may create additional demand on electric utility grid infrastructure. Additionally, during certain time periods, the demand for electric power may rise so significantly that it may be difficult to meet the electric power requirements at affordable prices. For example, when commuters arrive home in the evening, many PEVs may demand electric power at the same time. Consequently, the increase in demand may cause large peak electric power loads and transients for utility power grids. If this demand is not managed properly, the utility power grids will need to make significant investments to upgrade transformers, and employ fast response electric power plants.

In view of the foregoing, it would be beneficial and advantageous to provide a system and method that may optimally manage and plan for increased electric power demand of electric vehicles including hybrid electric vehicles or plug-in hybrid electric vehicles.

BRIEF DESCRIPTION

Briefly in accordance with one aspect of the embodiments, a system for optimal planning of electric power demand is presented. The system includes a node comprising one or more smart charging plug-in electric vehicles (SCPEVs), a processing subsystem, wherein the processing subsystem receives relevant data from one or more sources, and determines an optimized SCPEV load and optimal charging schedule for the node by applying an operations research technique on the relevant data.

In accordance with an aspect of the present technique, a method for optimal planning of electric power demand is presented. The method includes receiving relevant data from one or more sources, and determining an optimized SCPEV load and optimal charging schedule for a node by applying an operations research technique on the relevant data.

DRAWINGS

Figure 2:
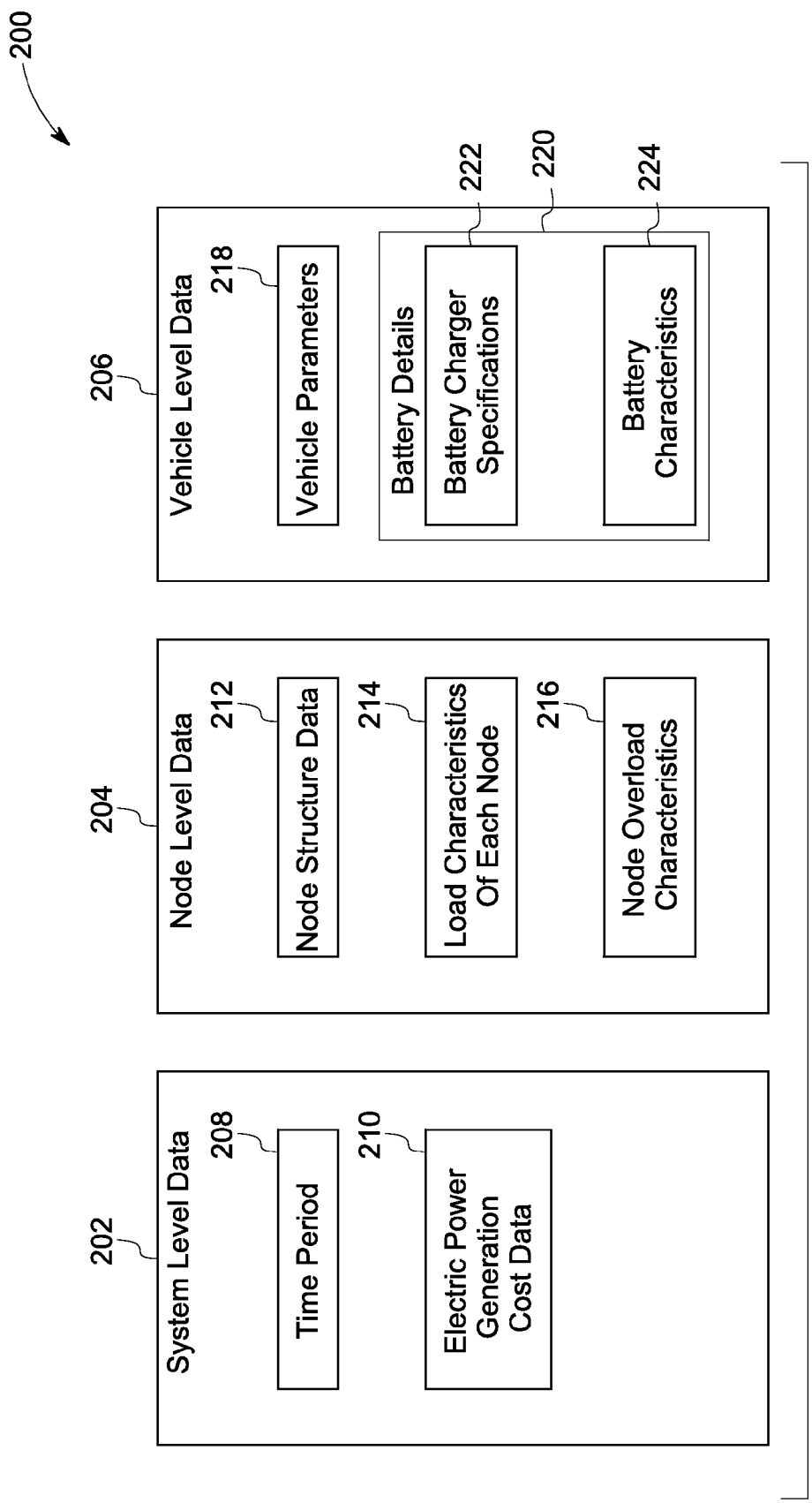
Figure 3A:
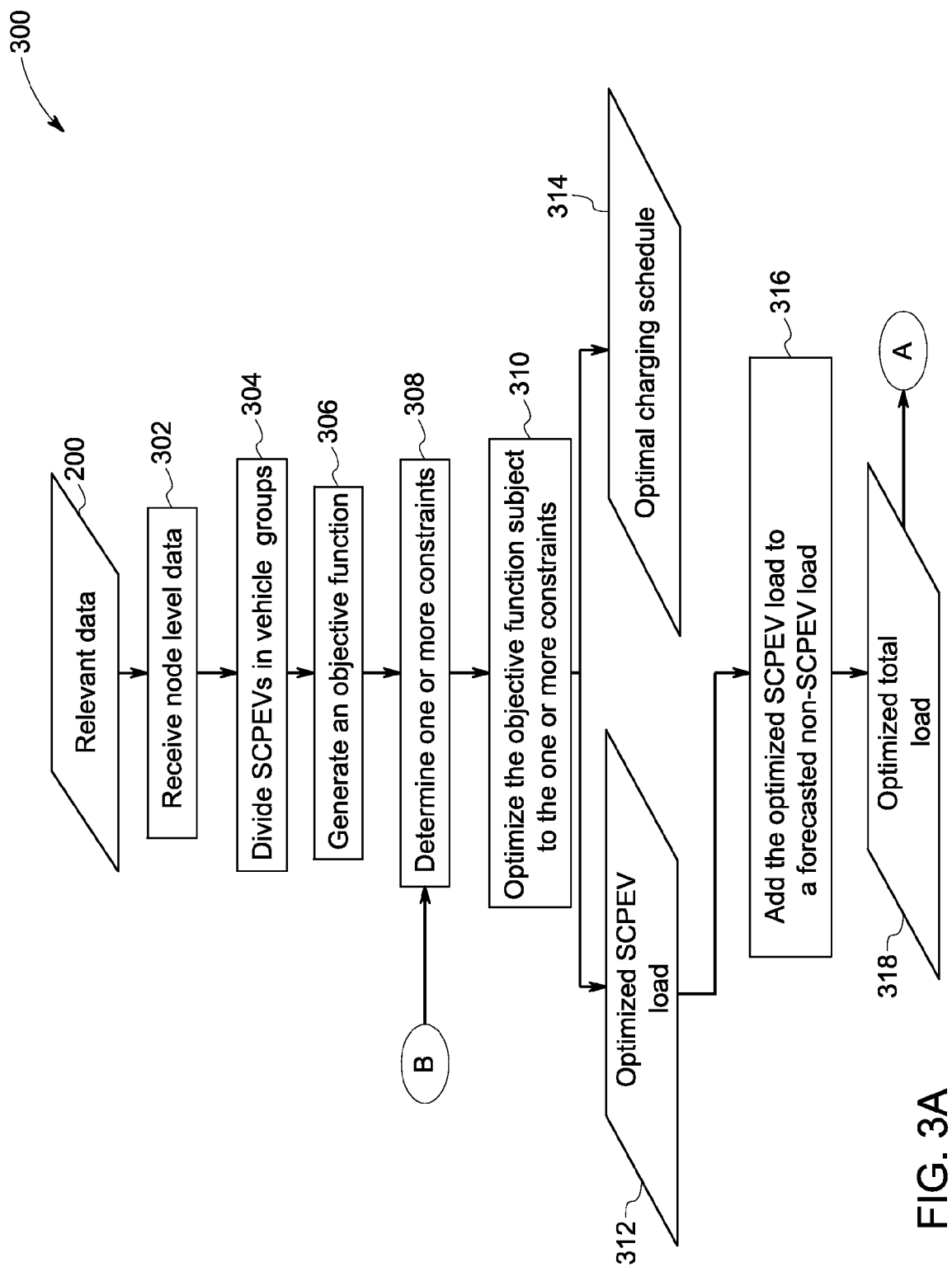
Figure 3B:
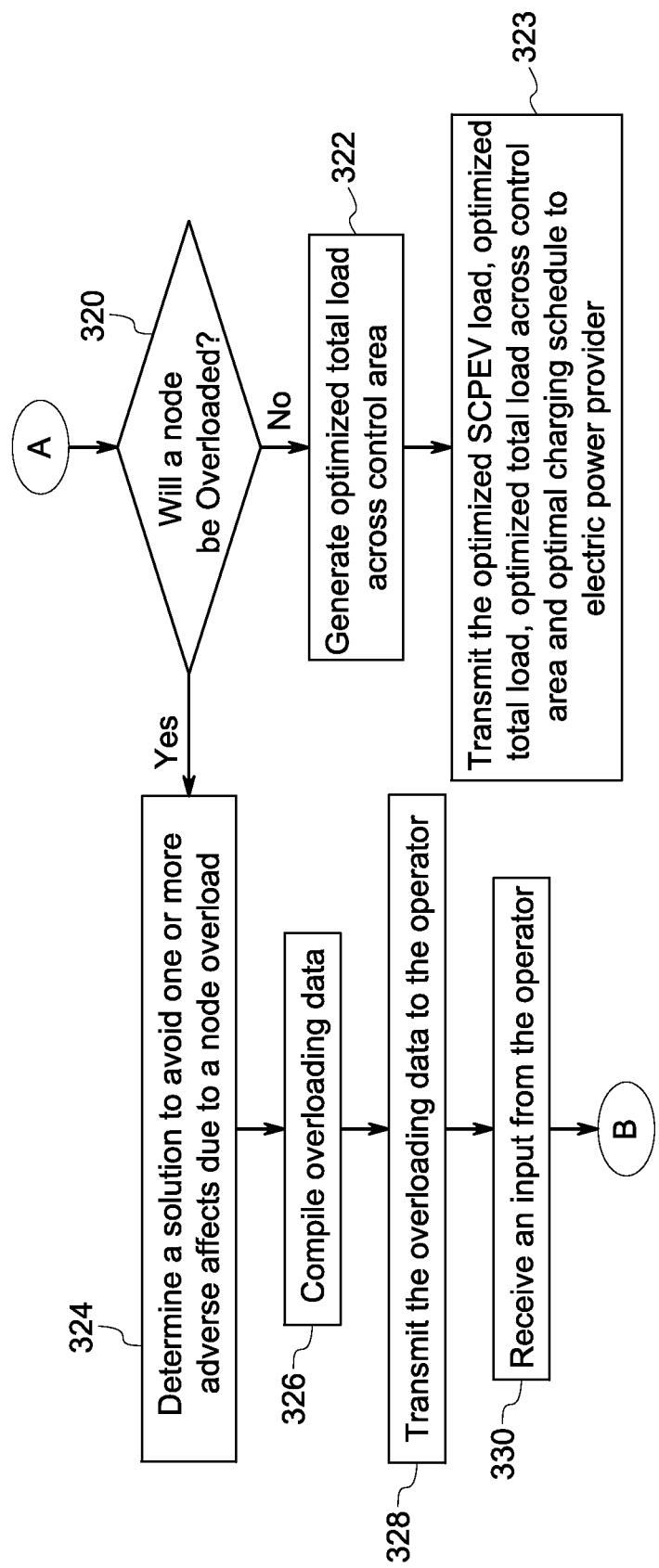

These and other features, aspects, and advantages of the present invention will become better understood when the following detailed description is read with reference to the accompanying drawings in which like characters represent like parts throughout the drawings, wherein:

FIG. 1 is a diagrammatic illustration of an exemplary system for optimal planning of electric power demand for smart charging plug-in electric vehicles (SCPEVs), in accordance with an embodiment of the present system;

FIG. 2 is a block diagram that illustrates an exemplary relevant data that is used by a processing subsystem in FIG. 1 for optimal planning of electric power demand for smart charging plug-in electric vehicles (SCPEVs), in accordance with an embodiment of the present techniques; and FIGS. 3A and 3B are flowcharts representing an exemplary method for optimally managing electric power demand for smart charging plug-in electric vehicles (SCPEVs).

DETAILED DESCRIPTION

As discussed in detail below, embodiments of the present system and techniques may plan for an optimized load and optimal charging schedule for smart charging plug-in electric vehicles (SCPEVs). Hereinafter, the terms "optimized load for smart charging plug-in electric vehicles (SCPEV)" and "optimized SCPEV load" will be used interchangeably. The term "optimized SCPEV load" is used herein to refer to a predicted amount of electric power that may be provided to SCPEVs at specified time periods to minimize the costs (or other objective determined by the utilities) associated with charging while complying with the one or more constraints. The one or more constraints, for example, may include constraints imposed by an owner of a SCPEV, constraints of a utility grid, constraints due to a rated capacity of a transformer, constraints due to charger and battery specifications, and the like.

Additionally, the present system and techniques may generate the optimal charging schedule for the SCPEVs. The term "optimal charging schedule" is used herein to refer to a schedule that may be used for optimally charging the SCPEVs. Furthermore, the term "smart charging plug-in electric vehicle (SCPEV)" is used herein to refer to a plug-in electric vehicle (PEV) that is charged based upon the optimal charging schedule and/or optimized SCPEV load. For example, a SCPEV includes a plug-in electric vehicle (PEV) that opts for charging based upon the optimized SCPEV load. The charging of SCPEVs based upon the optimal charging schedule and optimized SCPEV load may reduce distribution overloads, electric power generation cost and the ultimate electric power cost to a consumer. The optimal charging schedule, for example, may include a unique id of each SCPEV, an amount of electric power to be provided to each SCPEV, a voltage at which electric power should be provided to each SCPEV, and time slots when a battery in each SCPEV should be charged. In one embodiment, the optimal charging schedule and optimized SCPEV load may be generated for being used in the next few minutes, next twenty-four hours or next day. In alternative embodiment, the optimal charging schedule and optimized SCPEV load may be generated for a predefined time period as specified by an operator or user.

FIG. 1 is a diagrammatic illustration of an exemplary system 100 for optimal planning of electric power demands of SCPEVs. Particularly, the system 100 plans for an optimized SCPEV load that may be used for charging the SCPEVs. For example, if the optimized SCPEV load is 1200 kW for charging a group of SCPEVs at a specified time, then the group of SCPEVs may be charged at up to 1200 KW during the specified time. In alternative embodiments, the system 100 generates an optimal charging schedule that may be used for charging SCPEVs. As shown in FIG. 1, the system 100 includes a plurality of nodes 102, 104. As used herein, the term "node" may be used to refer to a substation, feeder, or transformer on a utility grid or another area in a utility grid where load is aggregated. In one embodiment, the nodes 102, 104, for example, may be a residential area, a commercial area, or any other area defined by a utility for distribution of electric power. In certain embodiments, a node may include another node. The node that includes another node may also be referred to as a parent node, and another node may be referred to as a child node. For example, in the presently contemplated configuration, a node 105 is a child node in the parent node 102. Hereinafter, the terms, "parent node 102" and "node 102" will be used interchangeably.

As shown in the presently contemplated configuration, an electric power provider 106 supplies electric power through transmission lines 108, 110 to customers located in the nodes 102, 104. The electric power provider 106, for example, may include a utility power plant, a company or association that supplies electric power, or the like. In this exemplary embodiment, the customers include houses 112, factories 114 and commercial places 116. In the presently contemplated configuration, the electric power provider 106 supplies electric power through the transmission line 108 to the houses 112 located in the node 102. Similarly, the electric power provider 106 supplies electric power through the transmission line 110 to the factories 114 and commercial locations 116 located in the node 104. The electric power supplied through the transmission lines 108, 110 is transmitted at very high voltage to save energy losses. Therefore, before transmission of electric power to the customers 112, 114, 116, electric power is transmitted to respective distribution transformers 118, 120, 122 that are located in respective nodes 102, 104. The distribution transformers 118, 120, 122 reduce voltage of the electric power before distributing the electric power to the customers 112, 114, 116 located in respective nodes 102, 104. The customers 112, 114, 116 may use the electric power for charging respective SCPEVs 128, 130, 132. For example, as shown in the presently contemplated configuration, the customers located in the houses 112 may use the electric power for charging respective SCPEVs 128, 130. Similarly, customers located in the commercial complex 116 may use the electric power to charge respective SCPEV 132.

It may be noted that each of the transformers 118, 120, 122 have a rated capacity. The rated capacity is a maximum amount of electric power that may be transmitted across the transformers 118, 120, 122. Therefore, the amount of electric power that is transmitted by the distribution transformers 118, 120, 122 may not exceed the rated capacity. However, in certain embodiments, an operator 140 may manage to exceed the rated capacity of the transformers 118, 120, 122. The rated capacity of the transformers 118, 120, 122 may be exceeded for short durations. In certain embodiments, the present system 100 plans for the optimized SCPEV load based upon one or more inputs of the operator 140. The inputs of the operator 140, for example, may relate to an amount and time period for extension of the rated capacity of the distribution transformers 118, 120, 122.

The system 100 further includes a processing subsystem 134 that generates the optimized SCPEV load and optimal charging schedule of the SCPEVs 128, 130, 132 for respective control area 124. In the presently contemplated configuration, the nodes 102, 104 collectively form the control area 124 of the processing subsystem 134. The processing subsystem 134 may generate the optimized SCPEV load and optimal charging schedule based upon one or more relevant data. In one embodiment, the processing subsystem 134 receives the relevant data from the electric power provider 106, an energy management system (EMS) 136, a supervisory control and data acquisition (SCADA) 138, the operator 140 and the SCPEVs 128, 130, 132. However, in certain embodiments the processing subsystem 134 may be configured to determine the relevant data or receive the relevant data from other components or softwares.

The processing subsystem 134 generates the optimized SCPEV load and optimal charging schedule by application of operations research techniques on the relevant data. The operations research techniques include a mathematical programming technique, a heuristic technique, or the like. The generation of the optimized SCPEV load and optimal charging schedule of the SCPEVs 128, 130, 132 will be explained in greater detail with reference to FIGS. 3A and 3B. Furthermore, the components of the relevant data will be explained in greater detail with reference to FIG. 2.

Referring now to FIG. 2, an exemplary relevant data 200 that is used by the processing subsystem 134 in FIG. 1 to generate the optimized SCPEV load and optimal charging schedule of the SCPEVs 128, 130, 132 is shown. For ease of understanding, the relevant data 200 is divided in to three categories including system level data 202, node level data 204 and vehicle level data 206. As used herein, the term "system level data" is used to refer to data that includes time period for which an optimized SCPEV load and optimal charging schedule is required to be generated, and data related to cost of electric power at predefined times. By way of a non-limiting example, the system level data 202 may include time period 208 and electric power generation cost data 210. The time period 208 includes a number of minutes, hours or days for which the optimized SCPEV load or optimal charging schedule of SCPEVs 128, 130, 132 may be generated. For example, the time period 208 may be the next twenty-four hours, next day, and the like. The time period 208 and electric power generation cost data 210, for example, may be received from the electric power provider 106, EMS 136, SCADA 138, or operator 140 (see FIG. 1), or the wholesale electricity market. Furthermore, the system level data 202 includes electric power generation cost data 210 that includes the cost of supplying electric power for specified levels of electric power demand. The electric power generation cost data 210, for example, may include an electric power generation cost curve, a table that includes cost for each range of quantity of power, or the like.

As previously noted, the relevant data 200 includes node level data 204. The term "node level data" is used herein to refer to information related to the nodes 102, 104 (see FIG. 1). By way of a non-limiting example, the node level data 204 may include node structure data 212, load characteristics of each node 214 and node overload characteristics 216. The node structure data 212, for example, may include a parent node and a child node relationship information for each node, a unique identification (unique id) of the parent node and unique identification of the child node. For example, as previously observed with reference to FIG. 1, a node may include one or more nodes, such as, the node 102 includes the node 105. Therefore, the node 102 in FIG. 1 is a parent node and the node 105 is a child node.

Furthermore, the node level data 204 may include load characteristics 214 of each node. The load characteristics 214 of each node, for example, may include a unique id of each node, a forecasted or actual non-SCPEV load at the node for a specified time, a load limit at the node, and a unique id and a rated capacity of each transformer 118, 120, 122 in each node 102, 104. As used herein, the term "forecasted or actual non-SCPEV load" of each node 102, 104 is a potential total power requirement of a node at a specified time excluding the power requirements of respective SCPEVs in the node. For ease of understanding an exemplary Table 1 that includes load characteristics data 214 of the nodes 102, 104 is shown below.

cooled after overloading, power lines that may be overloaded, or the like. The node overload characteristics 216, for example, may be used by the processing subsystem 134 to determine a possibility of overloading of one or more of the transformers 118, 120, 122 or power lines.

Moreover, as previously noted, the relevant data 200 includes the vehicle level data 206. As used herein, the term "vehicle level data" is used herein to refer to data related to each SCPEV 128 130, 132 and one or more batteries in each SCPEV 128 130, 132. As shown in the presently contemplated configuration, the vehicle level data 206 includes vehicle parameters 218 and battery details 220. The vehicle parameters 218 includes data related to each SCPEV 128 130, 132. For example, the vehicle parameters 218 may include a unique id of each node 102, 104, 105 and SCPEVs 128, 130, 132, a starting state of charge (SOC), an ending SOC, an expected starting time for charging, a maximum rate of charging, a desired end time for charging and charging time for charging each SCPEV 128, 130, 132. As used herein, the term "expected starting time" may be used to refer to a time at which charging of a SCPEV is expected to start. Furthermore, as used herein, the term "desired end time for charging" may be used to refer to a time when a SCPEV should be fully charged. In certain embodiments, when one or more nodes do not include an SCPEV, the vehicle parameters 218 may not include data related to such nodes. Table 2 that includes exemplary vehicle parameters 218 for the next twenty-four hours of each SCPEV 128 130, 132, is shown below.

TABLE 2

| Unique id of node | Unique id of respective SCPEV | Starting state of charge (SOC) | End SOC | Expected starting time for charging | Desired end time for charging | Charging time (in hours) |
|---|---|---|---|---|---|---|
| P_Node_102 | SCPEV_128 | 20% | 90% | 8 p.m. | 7 a.m. (Next day) | 2 |
|  | SCPEV_130 | 20% | 90% | 8 p.m. | 7 a.m. (Next day) | 2 |
| P_Node_104 | SCPEV_132 | 10% | 90% | 10 p.m. | 5 a.m. (Next day) | 4 |

TABLE 1

|  | t1 | t2 | t3 |
|---|---|---|---|
| P_Node_102 and respective transformer Trans_118 ||||
| Forecasted or actual Non-SCPEV load | 400 kW | 200 kW | 170 kW |
| Rated capacity of respective transformer Trans_118 | 450 kVA | 450 kVA | 450 kVA |
| P_Node_104 and respective transformer Trans_122 ||||
| Forecasted or actual Non-SCPEV load | 1000 kW | 650 kW | 600 kW |
| Rated capacity of respective transformer Trans_122 | 1000 kVA | 1000 kVA | 1000 kVA |

Additionally, the node level data 204 includes node overload characteristics 216. The node overload characteristics 216, for example, includes a unique id of a node, a unique id of respective transformer in the node, a time period for which a transformer may be overloaded, maximum overload, a minimum amount of time till when a transformer should be Furthermore, the vehicle level data 206 includes the battery details 220. As used herein, the term "battery details" may be used to refer to data related to one or more batteries in each SCPEV 128 130, 132. For example, the battery details 220 may include battery charger specifications 222 and battery characteristics 224. The battery charger specifications 222 may include a rate for charging the battery in each respective SCPEV 128 130, 132, maximum charging current, voltage of a power socket, and the like. Similarly, the battery characteristics 224 may include an ambient temperature of a battery in each SCPEV 128 130, 132, battery charging performance curve, and the like.

Turning now to FIGS. 3A and 3B, an exemplary flowchart 300 representing steps for optimal planning of electric power demand for charging plug-in electric vehicles is depicted. Specifically, FIGS. 3A and 3B describe a method for optimal planning of electric power demand by using an operations research technique. As previously noted with reference to FIG. 1, the operations research techniques may include mathematical programming technique, a heuristic technique, or the like. FIGS. 3A and 3B apply a mathematical programming technique for optimal planning of electric power demand for charging plug-in electric vehicles.

The method starts at step 302 where the relevant data 200 may be received. As previously noted with reference to FIG. 2, the relevant data 200 includes the system level data 202, node level data 204 and vehicle level data 206 (see FIG. 2). The relevant data 200, for example, may be received by the processing subsystem 134 from the electric power provider 106, one or more transformers 118, 120, 122, SCPEV 128, 130, 132, EMS 136, SCADA 138 and the operator 140. Subsequent to the receipt of the relevant data 200, at step 304 one or more SCPEVs 128, 130, 132 may be divided in to one or more vehicle groups. As used herein, the term "vehicle group" may be used to refer to a group of one or more SCPEVs that have one or more similar features or electric power requirements. For example, a vehicle group may include one or more SCPEVs that require a similar amount of electric power per hour, and has a similar charging time period, expected starting time for charging and desired end time for charging. In one embodiment, a vehicle group may include a single SCPEV. For ease of understanding, the SCPEVs 128, 130, 132 is shown as divided in to two groups in Table 3.

TABLE 3

| Vehicle Group | Unique id of SCPEV | Energy needed per hour | Expected starting time for charging | Desired end time for charging | Total charging time (in hours) |
|---|---|---|---|---|---|
| C1 | SCPEV_128 | 2 kW | 8 p.m. | 7 a.m. (Next day) | 4 |
|  | SCPEV_130 | 2 kW | 8 p.m. | 7 a.m. (Next day) | 4 |
| C2 | SCPEV_132 | 3 kW | 9 a.m. | 5 p.m. (Next day) | 6 |

As shown in Table 3, the SCPEVs 128 and 130 are in a vehicle group 'C1' due to a similar expected starting time and desired end time for charging each SCPEV 128, 130. The expected starting time for charging and the desired end time for charging, for example, may be specified by the customer 112, 114, 116 (see FIG. 1). Since the corresponding expected starting time and desired end time for charging the SCPEV 132 is different to that of the SCPEVs 128, 130, the SCPEV 132 is in an another vehicle group 'C2'. It may be noted that the vehicle groups, such as, the vehicle groups 'C1' and 'C2' may be made based upon the system level data 202, node level data 204 and vehicle level data 206.

Furthermore, at steps 306 and 308, a mathematical programming model may be generated. The generation of mathematical programming model includes generation of an objective function and one or more constraints. At step 306, the objective function may be generated based upon the relevant data 200. More particularly, an objective function may be generated based upon one or more portions of the system level data 202, node level data 204 and vehicle level data 206. Furthermore, at step 308, one or more constraints may be determined. As used herein, the term "constraint" may be used to refer to one or more conditions that must be satisfied for determination of an optimized SCPEV load and an optimal charging schedule. The one or more constraints may be determined based upon one or more portions of the relevant data 200. The constraints, for example, may include constraints opted by a customer, such as, an expected starting time for charging, a desired end time for charging, a rate of charging the respective SCPEV 128, 130, 132, and the like. The one or more constraints may also include constraints of respective battery in each SCPEV 128, 130, 132, constraints due to rated capacity of the respective transformers 118, 120, 122, and the like. By way of an exemplary embodiment, one or more constraints may include the following:

a. Each SCPEV in a vehicle group should be charged with in an expected starting time for charging and a desired end time for charging SCPEVs in the vehicle group. For example, as shown in Table 4, the SCPEVs 128, 130 having the unique ids SCPEV_128 and SCPEV_130 in the vehicle group 'C1' should be charged between 8 p.m. to 7 a.m.

b. The total electric power supplied to a node may be less than or equal to a rated capacity of one or more transformers in the node.

It may be noted that the abovementioned exemplary constraints have been explained for ease of understanding, and the present invention should not be restricted to the exemplary constraints. Subsequently, at step 310, the objective function generated at step 306 may be optimized subject to the constraints determined at step 308. The objective function, for example, may be optimized by implementing techniques including LPSolve, cassowary constraint solver, or the like. As shown in FIG. 3A, consequent to the optimization of the objective function at step 310, an optimized SCPEV load 312 and an optimal charging schedule 314 for each vehicle group/node may be generated. As previously noted, the term "optimized SCPEV load" is used herein to refer to an amount of electric power that may be provided to SCPEVs at specified time periods while complying with one or more constraints and minimizing the costs to supply electricity. An exemplary optimized SCPEV load for each node/vehicle group at various times in a specified time period may be as shown by Table 4. In addition, an exemplary optimal charging schedule 314 is shown by Table 4.

TABLE 4

|  | t1 | t2 | t3 |
|---|---|---|---|
|  | P_Node_102 | | |
| Optimized SCPEV Load | 0 kW | 300 kW | 280 kW |
|  | P_Node_104 | | |
| Optimized SCPEV Load | 50 kW | 300 kW | 280 kW |

TABLE 5

| Vehicle Group | Number of SCPEVs in the vehicle group | Charging time (in hours) | $t_1$ | $t_2$ | $t_3$ | $t_4$ | $t_5$ | $t_6$ |
|---|---|---|---|---|---|---|---|---|
| V1 | 800 | 3 |  |  | 800 | 800 | 800 |  |
| V2 | 100 | 3 |  | 100 | 100 | 100 |  |  |
| V3 | 600 | 2 |  | 600 | 551 | 49 |  |  |

As shown in exemplary Table 5, there are three vehicle groups including V1, V2, V3. The vehicle groups V1, V2, V3 includes 800, 100 and 600 SCPEVs, respectively. Furthermore, the charging time for each SCPEV in the vehicle groups V1, V2, V3 is 3 hours, 3 hours and 2 hours, respectively. The optimal charging schedule 314 in Table 5 shows that each of the 800 SCPEVs in the vehicle group V1 may be charged in time slots t3, t4 and t5. Similarly, each of the 600 SCPEVs in the vehicle group V3 may be charged in the time slot t2, 551

SCPEVs in the vehicle group V3 may be charged in the time slot t3, and 49 SCPEVs in the vehicle group V3 may be charged in time slot t4.

Subsequent to the determination of the optimized SCPEV load 312 and optimal charging schedule 314, the optimized SCPEV load 312 may be added to a forecasted non-SCPEV load at step 316. As previously noted with reference to FIG. 2, the forecasted non-SCPEV load may be extracted from the load characteristics 214 (see FIG. 2) of each node 102, 104 in the node level data 204 (see FIG. 2). The forecasted non-SCPEV load, for example, may be received from the electric power provider 106, EMS 136, SCADA 138, operator 140, or the like. Consequent to the addition of the optimized SCPEV load 312 to the forecasted or actual non-SCPEV load, optimized total load 318 is generated. As used herein, the term "optimized total load" is used herein to refer to electric power demand of all devices connected to the grid, including SCPEVs and all other non SCPEV loads. An exemplary Table 6 that includes the optimized total load 312 determined by adding the optimized SCPEV load 312 and forecasted non-SCPEV load is shown in Table 6.

TABLE 6

| | t1 | t2 | t3 |
|---|---|---|---|
| P_Node_102 and respective transformer Trans_118 | | | |
| Forecasted or actual Non-SCPEV load | 400 kW | 200 kW | 170 kW |
| Optimized SCPEV Load | 0 kW | 300 kW | 280 kW |
| Optimized Total Load | 400 kW | 500 kW | 450 kW |
| Rated capacity of respective transformer Trans_118 | 450 kVA | 450 kVA | 450 kVA |
| P_Node_104 and respective transformer Trans_122 | | | |
| Forecasted or actual Non-SCPEV load | 1000 kW | 650 kW | 600 kW |
| Optimized SCPEV Load | 50 kW | 300 kW | 280 kW |
| Optimized Total Load | 1050 kW | 950 kW | 880 kW |
| Rated capacity of respective transformer Trans_122 | 1000 kVA | 1000 kVA | 1000 kVA |

Furthermore, at step 320, a check may be carried out to determine if the optimized total load 318 may overload one or more of the nodes 102, 104. At step 320, if it is determined that the optimized SCPEV load 312 may not overload one or more of the nodes 102, 104, then the control may be transferred to 322. At step 322, an optimized total load across the control area 124 (see FIG. 1) may be determined. As previously noted the control area 124 includes the nodes 102, 104, 105. The optimized total load across the control area 124 may be determined by adding the optimized total load 318 of each of the nodes 102, 104. The optimized total load across the control area 124 of the processing subsystem 134 is shown by Table 7.

TABLE 7

| | t1 | t2 | t3 |
|---|---|---|---|
| Optimized total load across control area | 1450 kW | 1450 kW | 1330 kW |

At step 323, the optimized SCPEV load 312, optimal charging schedule 314, optimized total load 318 and the optimized total load across the control area 124 may be transmitted to the electric power provider 106 by the processing subsystem 134. However, at step 320, if it is determined that the optimized total load 318 may overload one or more of the nodes 102, 104 then the control is transferred to step 324. At step 324, a solution for avoiding overloading of one or more of the nodes 102, 104 is determined. In one embodiment, a solution may be determined to use the optimized SCPEV load 312 to avoid the overloading of one or more of the nodes 102, 104. In another embodiment, the solution may be determined to know whether the overloading of one or more of the nodes 102, 104 may be maintained for a time period that may not adversely affect the nodes 102, 104. In one embodiment, the solution, for example, may include overloading one or more of the transformers 118, 120, 122 for short time periods and cooling for a specified time period. In another embodiment, the solution may include a suggestion to allow overloading of one or more of the transformers 118, 120, 122 as the overloading is within a maximum overloading capacity of one or more of the transformers 118, 120, 122. In another embodiment, a subset of the SCPEVs could be charged to a level below their maximum and/or desired state of charge. By undercharging the SCPEVs, the transformer or other grid overload could be alleviated.

Subsequently at step 326, overloading data related to overloading of one or more of the nodes 102, 104 may be compiled. The term "overloading data" may be used herein to refer to data relating to overloading of the one or more transformers or distribution lines and the solution to the overload. The overloading data, for example may include a unique id of node/vehicle group that may be overloaded, a unique id of a respective transformer in the node that may overloaded, an optimized SCPEV load of the node or vehicle group, an optimized total load of the node or vehicle group, rated capacity of the transformer that may be overloaded and a solution that has been determined at step 324. Furthermore, at step 328, the overloading data may be transmitted to the operator 140 (see FIG. 1). In certain embodiments, the overloading data may be transmitted to the EMS 136, SCADA 138, or the like.

At step 330, inputs of the operator 140 may be received. The suggestion, for example, may indicate maximum optimized SCPEV load that may be offered at a time period. The suggestion may also include an allowance of the optimized SCPEV load that may overload one or more of the transformers 118, 120, 122 for a short time duration. Subsequently, the control may be transferred to step 308 where one or more constraints may be determined. In one embodiment, the constraints may include a constraint that is formed based upon the suggestion of the operator 140. Subsequently the steps 308-322 are repeated.

Embodiments of the present systems and methods may optimally manage electric power demand of electric vehicles. The systems and methods determine optimized total load and optimal charging schedule which results in distribution of load on the electric utility over a specified time period. The charging of electric vehicles based upon the optimized total load and optimal charging schedule may reduce distribution overloads, electric power generation cost, and ultimate electric power cost to a consumer. Furthermore, usage of the present systems and methods may reduce one or more failures in the electric utility and other components due to distribution overloads. The methods and systems may determine the optimized total load and optimal charging schedule ahead of time to facilitate the electric utility plan ahead of time. The electric utility may use the optimized total load and optimal charging schedule for controlling the charging of plug-in electric vehicles. The present methods and systems determine the optimal charging schedule and optimized total load based upon one or more constraints that may be specified by the utility, operator or consumers.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A system for optimal planning of electric power demand, comprising:
    a node comprising one or more smart charging plug-in electric vehicles (SCPEVs);
    a processing subsystem, wherein the processing subsystem:
        receives system level data, node level data and vehicle level data from one or more sources; and
        determines an optimized SCPEV load and optimal charging schedule for the node by applying at least a mathematical programming technique programming technique on the system level data, node level data and vehicle level data,
        wherein the node comprises a residential area, a commercial area, or any other area defined by a utility for distribution of electric power, and the node level data comprises load characteristics of the node, wherein the mathematical programming technique comprises:
    dividing the one or more SCPEVs in to one or more groups;
    generating an objective function based upon one or more portions of the system level data, node level data and vehicle level data and determining one or more constraints; and
    optimizing the objective function subject to the one or more constraints to determine the optimized SCPEV load and the optimal charging schedule for the one or more groups.

2. The system of claim 1, wherein the system level data comprises time period and electricity power generation cost curve.

3. The system of claim 1, wherein the node level data comprises node structure data, and node overload characteristics, wherein the node structure data comprises a parent node and a child node relationship information.

4. The system of claim 1, wherein the vehicle level parameters comprises vehicle parameters and battery details.

5. The system of claim 1, wherein the one or more sources comprise an operator, a system control data acquisition subsystem (SCADA), an energy management system (EMS), an electric power provider (EPP), or combinations thereof.

6. The system of claim 1, wherein the one or more constraints comprise constraints imposed by an owner of a SCPEV, constraints of a utility grid, constraints due to a rated capacity of a transformer, constraints due to charger and battery specifications, or combinations thereof.

7. The system of claim 1, wherein the processing subsystem further determines an optimized total load by adding the optimized SCPEV load and a forecasted non-SCPEV load.

8. The system of claim 1, wherein the processing subsystem further carries out a check to determine whether the node may be overloaded due to the optimized total load.

9. A method for optimal planning of electric power demand, comprising:
    receiving system level data, node level data and vehicle level data from one or more sources; and
    determining an optimized smart charging plug-in electric vehicles load and optimal charging schedule for a node by applying at least a mathematical programming technique programming technique on the system level data, node level data and vehicle level data,
        wherein the node comprises a residential area, a commercial area, or any other area defined by a utility for distribution of electric power, and the node level data comprises load characteristics of the node, wherein the mathematical programming technique comprises:
    dividing the one or more smart charging plug-in electric vehicles in to one or more groups;
    generating an objective function based upon one or more portions of the system level data, node level data and vehicle level data and determining one or more constraints; and
    optimizing the objective function subject to the one or more constraints to determine the optimized smart charging plug-in electric vehicles load for the one or more groups.

10. The method of claim 9, further comprising generating an optimized total load based upon the optimized smart charging plug-in electric vehicles load and a forecasted non-SCPEV load.

11. The method of claim 9, further comprising updating the optimized smart charging plug-in electric vehicles load and the optimal charging schedule based upon an updated system level data, an updated node level data and an updated vehicle level data.

12. The method of claim 9, further comprising: a step of carrying out a check to determine whether the node may be overloaded due to the optimized total load.

13. The method of claim 12, further comprising:
    determining a solution to avoid one or more adverse effects due to overloading of the node;
    compiling overloading data utilizing the system level data, node level data and vehicle level data and the solution;
    transmitting the overloading data and the solution to an operator;
    receiving an input from the operator based upon the overloading data; and
    determining the optimized smart charging plug-in electric vehicles load utilizing the operations research technique based upon the input.

14. The system of claim 9, wherein the one or more constraints comprises one or more conditions that must be satisfied for determination of an optimized smart charging plug-in electric vehicles load and an optimal charging schedule.

* * * * *